US006823525B1

(12) United States Patent
Martyn

(10) Patent No.: US 6,823,525 B1
(45) Date of Patent: Nov. 23, 2004

(54) METHOD FOR DISPLAYING SINGLE MONITOR APPLICATIONS ON MULTIPLE MONITORS DRIVEN BY A PERSONAL COMPUTER

(75) Inventor: Tom C. Martyn, Seattle, WA (US)

(73) Assignee: ATI Technologies Inc., Ontario (CA)

( * ) Notice: Subject to any disclaimer, the term of this patent is extended or adjusted under 35 U.S.C. 154(b) by 649 days.

(21) Appl. No.: 09/755,549

(22) Filed: Jan. 3, 2001

Related U.S. Application Data

(60) Provisional application No. 60/177,746, filed on Jan. 21, 2000.

(51) Int. Cl.[7] .............................. G06F 9/00; G06F 9/46
(52) U.S. Cl. ...................................................... 719/323
(58) Field of Search ................................ 719/323, 324, 719/322, 321; 345/1.1, 1.2, 1.3, 530, 531, 564

(56) References Cited

U.S. PATENT DOCUMENTS

| | | | | |
|---|---|---|---|---|
| 5,018,076 A | * | 5/1991 | Johary et al. ................ | 345/573 |
| 5,432,900 A | * | 7/1995 | Rhodes et al. ............ | 715/500.1 |
| 5,581,766 A | * | 12/1996 | Spurlock ....................... | 713/2 |
| 5,835,090 A | | 11/1998 | Clark et al. .................. | 345/339 |
| 5,923,307 A | * | 7/1999 | Hogle, IV ....................... | 345/4 |
| 5,949,437 A | * | 9/1999 | Clark .......................... | 345/502 |
| 6,240,468 B1 | * | 5/2001 | Capelli ......................... | 710/14 |
| 6,297,817 B1 | * | 10/2001 | Larson et al. ................ | 345/213 |
| 6,411,302 B1 | * | 6/2002 | Chiraz ......................... | 345/545 |
| 6,510,470 B1 | * | 1/2003 | Capelli ....................... | 719/323 |

OTHER PUBLICATIONS

N. Thompson, "Ride the WinG for Speedy Graphics", MSDN, Sep. 1994, pp (4).*
S. Diehl, "Window 95 Graphics Architecture", BYTE magazine, Jun., 1995, pp. (4).*
"AppianDX; A Solution for DirectX Display Across Multiple Monitors," an in–house white paper by Lisa Epstein, Sr. Product Manager, Appian Graphics, undated, pp. 1–3. not dated.
"What is DirectX?", printed from www.microsoft.com/directx/pavilion/general/whatisdx.htm, MicroSoft, Inc., Redmond, WA, Dec. 22, 1998, pp. 1–3.

* cited by examiner

Primary Examiner—Sue Lao
(74) Attorney, Agent, or Firm—Stoel Rives LLP

(57) ABSTRACT

A direct access driver solves limitations of DirectX operation under the Microsoft architecture when using multiple monitors. The direct access driver allows applications employing DirectX application program interfaces to use hardware acceleration without display errors on the monitors. Display errors can occur if multiple frame buffer addresses are returned in response to "GetFrameBufferAddress" DirectX calls. This invention returns a single address for two or more frame buffers on a display driver card by performing, without the DirectX application's knowledge, background operations that track hardware acceleration demands from two or more graphic user interfaces and frame buffers. The background operations entail constantly changing the frame buffer pointers relative to the location of offscreen DirectX application data, while one or more DirectX applications are moved in the display space from monitor to monitor. This is analogous to accurately tracking one of many moving objects in a fast-moving shell game.

7 Claims, 1 Drawing Sheet

METHOD FOR DISPLAYING SINGLE MONITOR APPLICATIONS ON MULTIPLE MONITORS DRIVEN BY A PERSONAL COMPUTER

RELATED APPLICATIONS

This application claims priority from U.S. Provisional Application No. 60/177,746, filed Jan. 21, 2000, for METHOD FOR DISPLAYING SINGLE MONITOR APPLICATIONS ON MULTIPLE MONITORS DRIVEN BY A PERSONAL COMPUTER.

FEDERALLY SPONSORED RESEARCH OR DEVELOPMENT

Not Applicable

COMPUTER PROGRAM LISTING APPENDIX

A preferred embodiment of this invention is described in C++ language source code program files named DDMulti.c and DDMulti.h, which are incorporated herein by reference and copies of which are stored on each of two identical appended CD-R compact disks labeled "Copy 1" and "Copy 2" that were created Oct. 23, 2000. On each disk, the file named "DDMulti.c" was created Jul. 6, 1999 and contains 44,620 bytes and the file named "DDMulti.h" was created Jul. 6, 1999 and contains 3,265 bytes.

TECHNICAL FIELD

This invention relates to computer systems employing a graphical user interface ("GUI") operating system and, in particular, to a method for driving multiple monitors from application programs that are, otherwise, limited to driving a single monitor.

BACKGROUND OF THE INVENTION

Computer systems now commonly include GUI operating systems that employ graphical objects, such as icons, windows, and dialog boxes, to prompt and receive user input. A user typically enters information by positioning a cursor within a designated area of a graphical desktop—e.g., by using a mouse, trackball, finger, stylus, direction keys or the like—to implement a desired function. GUI operating systems, such as MicroSoft® Windows@, have gained widespread acceptance because of their simple, intuitive operation and because they allow easy movement between multiple applications programs.

GIU users have responded to this flexible usability by demanded operating systems with enhanced desktop functionality, i.e., an operating system working area larger than the display area of a single monitor. One way of implementing an enhanced desktop is by utilizing multiple monitors or by employing a virtual desktop area where the display area of a single monitor can be "scrolled" across a larger graphical desktop. Such enhanced desktop systems achieve greater display capability without the expense or inconvenience of a single, larger monitor. Unfortunately, prior GUI operating systems were not specifically adapted for multiple monitor enhanced desktop operation and were often highly hardware dependent.

Solutions to the multiple monitor enhanced desktop problems are described in U.S. Pat. No. 5,835,090 for DESKTOP MANAGER FOR GRAPHICAL USER INTERFACE BASED SYSTEM WITH ENHANCED DESKTOP, which is assigned to the assignee of this application and is incorporated herein by reference. However, GUI operating systems and graphics-intensive applications running on them require considerable computer processing power. Indeed, the performance demands of users and graphic application developers have outstripped the performance capabilities of most processors, especially when operating a multiple monitor GUI operating system.

MicroSoft® has addressed many of the performance aspects of application programs by developing the DirectX® family of application program interfaces ("APIs"), which provide Windows-based software applications with direct access to display hardware resources. DirectX provides developers with a common set of instructions and software "components" that allow applications, such as multimedia applications, to run on any Windows-based personal computer ("PC") while ensuring that the applications take full advantage of any high-performance hardware capabilities to achieve the best possible performance.

DirectX® includes a wide variety of multimedia enabling technologies including DirectDraw®, Direct3D®, DirectInput, DirectSound®, DirectPlay®, DirectMusic®, DirectShow®, and DirectAnimation® to optimize the displaying graphics and video information. The DirectX Foundation layer components, DirectDraw and Direct3D, are of general importance, and the Media layer component, DirectShow, is importance for displaying graphics and video, particularly streaming video applications. In general, DirectX components have enabled the development of a new generation of high-performance gaming and video applications through the use of DirectDraw, Direct3D, and DirectShow calls.

Unfortunately, DirectX APIs running under Windows 95 and Windows NT 4.0 assume a single display monitor and are, therefore, incompatible with systems driving multiple monitors. More specifically, DirectX and applications written to DirectX, assume that only one graphics frame buffer is available for driving the single monitor. In DirectX, a complex sequence of calls (simply referred to hereafter as "GetFrameBufferAddress") allow DirectX applications to locate and access the single frame buffer. Graphic device drivers must support the GetFrameBufferAddress calls because they are used to write data directly into frame buffer memory, bypassing the typical Graphic Device Interface ("GDI") and, thereby, providing accelerated performance.

However, the graphics device driver can return only a single frame buffer address in response to the GetFrameBufferAddress calls, and most multiple monitor driver cards employ two or more frame buffers to implement multiple monitor displays. This begs the question, which of the two addresses does the multiple monitor device driver return? If the driver returns the address of the first frame buffer and the DirectX application is displaying through another frame buffer, or vice versa, display errors will occur. The alternative is to sacrifice hardware acceleration and employ the GDI to perform DirectX operations with processor resources, which dramatically increases processor utilization and decreases performance.

SUMMARY OF THE INVENTION

An object of this invention is, therefore, to provide a method for providing application programs with direct access to multiple display monitors running under a GUI operating system.

Another object of this invention is to provide a multiple monitor operating environment for applications employing MicroSoft® DirectX® APIs.

A further object of this invention is to provide a multiple monitor operating environment for DirectX® applications running under the MicroSoft® Windows® operating system.

A direct access driver of this invention solves the limitations of DirectX operation under the Microsoft architecture when using multiple monitors. The direct access driver allows applications employing DirectX APIs to employ hardware acceleration without display errors on any of the multiple monitors. As described in the background of this invention, display errors can occur if multiple frame buffer addresses are returned in response to "GetFrameBufferAddress" DirectX calls. The direct access driver of this invention returns a single address for two or more frame buffers on a display driver card by performing, without the DirectX application's knowledge, background operations that track the demand for hardware acceleration from two or more GUIs and frame buffers. The background operations entail constantly changing the frame buffer pointers relative to the location of offscreen DirectX application data, while one or more DirectX applications are moved in the display space from monitor to monitor. This is analogous to accurately tracking one of many moving objects in an extremely fast-moving shell game.

Additional objects and advantages of this invention will be apparent from the following detailed description of a preferred embodiment thereof that proceeds with reference to the accompanying drawing.

DETAILED DESCRIPTION OF A PREFERRED EMBODIMENT

Figure 1:
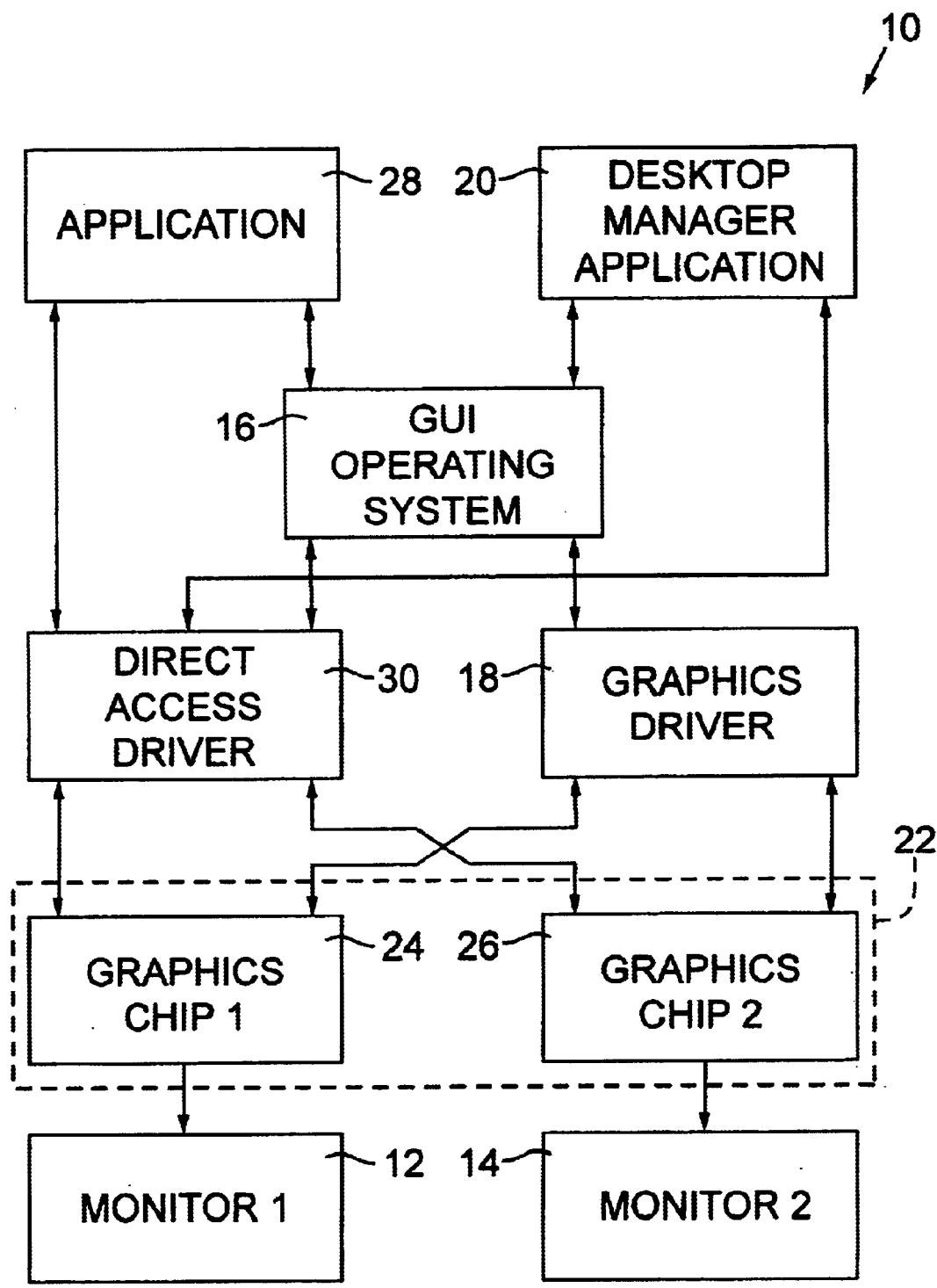
FIG. 1 is a simplified schematic block diagram of a multiple monitor computer system suitable for use with this invention

This invention is directed to displaying graphical objects on multiple monitors in a computer system including a single monitor-aware GUI operating system and is particularly beneficial for systems including an enhanced desktop and direct access APIs. In the following description, the invention is preferably set forth in the context of the WINDOWS® operating systems and DirectX® APIs that are available from Microsoft® Corporation of Redmond, Wash. It will be appreciated, however, that the specific implementations of this invention set forth below are exemplary and this invention is not limited to the specifically described functions or operating environment.

FIG. 1 shows a multiple monitor computer system 10 of this invention. Although more monitors may be employed in accordance with this invention, the illustrated system 10 includes first and second monitors 12 and 14. System 10 further includes: a GUI operating system 16, a graphics driver application 18, and a desktop manager application 20 (which may be combined into a single application); and a graphics card 22 including graphics chips 24 and 26 for operating respective monitors 12 and 14. Graphics chips 24 and 26 may be, for example, type GD5434 chips manufactured by Cirrus Logic. Any compatible graphics driver logic may be employed. Skilled workers will recognize that system 10 includes additional conventional elements that are not shown, such as a central processing unit ("CPU"), input/output ("110") busses, and static and dynamic memory.

GUI operating system 16 operates relatively independently from the display hardware, which provides greater hardware compatibility, but does not provide a mechanism whereby GUI operating system 16 can distinguish between a single, continuous desktop coextensive with the monitor display area (screen) and an enhanced desktop. The illustrated desktop manager 20 is operationally interposed between operating system 16 and an application program 28 to provide various functions for managing graphical object display in the enhanced desktop environment. Desktop manager application 20 monitors and modifies messages that pass between the application program 28 and GUI operating system 16. The detailed operation of desktop manager application 20 is described in U.S. Pat. No. 5,835,090, which is assigned to the assignee of this application and incorporated herein by reference.

Accordingly, GUI operating system 16 may conventionally receive drawing instructions from an application program 28 and instruct graphics driver 18 to draw on the conventional desktop generated by GUI operating system 16 or the enhanced desktop generated by desktop manager application 20.

Alternatively GUI operating system 16 and application program 28 may include DirectX® components such that graphic chip 24 may directly receive drawing instructions from application program 28 and draw on the conventional desktop generated by GUI operating system 16, thereby accelerating single monitor drawing operations. However, as described in the background section, accelerated drawing to multiple monitors is error prone.

Therefore, alternatively and preferably, GUI operating system 16 and application program 28 include DirectX® components, and system 10 further includes a direct access driver 30 of this invention that directly receives drawing instructions from application program 28 and draws on the enhanced desktop generated by desktop manager application 20 and spanning monitors 12 and 14, thereby accelerating multiple monitor drawing operations.

Direct access driver 30 solves the multiple monitor limitations of DirectX as follows. As stated in the summary of the invention, display errors can occur if multiple frame buffer addresses are returned in response to "GetFrameBufferAddress" DirectX calls. Direct access driver 30 circumvents this problem by returning a single address for two or more frame buffers by performing background operations, without the knowledge of DirectX application program 28. The background operations track the demand for hardware acceleration from an enhanced desktop and multiple frame buffers, such as ones associated with graphics chips 24 and 26. The background tracking operations entail constantly changing the frame buffer pointers relative to the location of offscreen DirectX application data, while one or more DirectX applications are moved in the display space among monitors 24 and 26. This is analogous to accurately tracking one of many moving objects in an extremely fast-moving shell game.

A preferred embodiment of this invention is described in C++ language source code program files named DDMulti.c and DDMulti.h, which are incorporated herein by reference and copies of which are provided in the above-described computer program listing appendix. In particular, refer to the functions named MultDDBlt( ) and MultDDLock.

Portions of the appended source code program files contain material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

In addition to providing hardware accelerated DirectX operation across multiple monitors in windowed mode, direct access driver 30, in conjunction with desktop manager application 20, further provides user selection of which monitor will display accelerated DirectX applications running in exclusive mode. This user selection informs direct access driver 30 which monitor the DirectX application should display on and returns the corresponding frame buffer address in response to "GetFrameBufferAddress" calls.

Direct access driver 30 is beneficial to DirectX applications that are not multiple-monitor aware, employ direct frame buffer access, and are programmed for DirectX 3.0 or later include. Such applications include ActiveMovie, ProShare Video Conferencing, and numerous game and video packages. Users of these DirectX applications include financial traders viewing broadcast video on the desktop, users of video conferencing, users viewing streaming video over the Internet, and DirectX gamers. Direct access driver 30 is available from the assignee of this application as a software product named "AppianDX™."

Table 1 shows multiple monitor system configurations under which DirectX display is problematical. In configurations indicating "Problems," AppianDX is advantageous for hardware acceleration of DirectX applications across multiple monitors without errors or application program 28 performance degradation.

TABLE 1

| DirectX version > Operating System | DirectX 3.0 | DirectX 5.0 | DirectX 6.0 and standard DirectX application | DirectX 6.0 and multiple-monitor aware DirectX application |
|---|---|---|---|---|
| Windows 95 | Problems | Problems | Problems | Problems |
| Windows NT 4.0 | Problems | Not Supported | Not Supported | Not Supported |
| Windows 98 | Problems | Problems | Problems | Okay |

Skilled workers will recognize that portions of this invention may be implemented differently from the implementations described above for a preferred embodiment without departing from the underlying principles thereof. The scope of this invention should, therefore, be determined only by the following claims.

I claim:

1. In a computer system including an application program having a first direct driver application user interface (API), a graphics user interface (GUI) operating system having a second direct driver API, and a graphics driver application, the first and second direct driver APIs and the GUI operating system being capable of driving only a single monitor without display errors, a method of driving multiple monitors without display errors, comprising:

providing at least first and second monitors;

installing in the computer system a graphics card including at least first and second frame buffers for operating at least the respective first and second monitors;

operationally interposing between the GUI operating system and the application program a desktop manager application for generating an enhanced display area that is coextensive with at least the first and second monitors;

bypassing the graphics driver application; and providing a direct access driver for receiving drawing instructions from the first and second direct driver APIs, at least one of the first and second direct driver APIs issuing a "GetFrameBufferAddress" call and returning a single frame buffer address related to at least the first and second frame buffers in response to the "GetFrameBufferAddress" call; and transferring the drawing instructions to at least the first and second frame buffers, thereby enabling and accelerating multiple monitor drawing operations.

2. The method of claim 1 in which the GUI operating system includes one of a MICROSOFT WINDOWS 95 operating system, a MICROSOFT WINDOWS 98 operating system, and a MICROSOFT WINDOWS NT 4.0 operating system.

3. The method of claim 1 in which the first and second direct driver APIs include at least one MICROSOFT DIRECTX API.

4. The method of claim 3 in which the MICROSOFT DIRECTX API is not multiple-monitor aware, employs direct access to the graphics card, and is a version 3.0 or later.

5. The method of claim 1 in which any of the graphics driver application, the direct access driver, and the desktop manager application are combined in a single application.

6. The method of claim 1 in which the desktop manager application converts single monitor drawing instructions to multiple monitor drawing instructions by monitoring and modifying drawing instructions that pass between the application program and GUI operating system.

7. The method of claim 1 further including:

tracking drawing instruction addresses;

changing a frame buffer address pointer when a drawing instruction address changes from one frame buffer to another frame buffer; and remapping the frame buffer address pointers into the single frame buffer address.

* * * * *